United States Patent
Jreij et al.

(10) Patent No.: US 8,719,410 B2
(45) Date of Patent: *May 6, 2014

(54) NATIVE BI-DIRECTIONAL COMMUNICATION FOR HARDWARE MANAGEMENT

(71) Applicant: Dell Products L.P., Round Rock, TX (US)

(72) Inventors: Elie Jreij, Pflugerville, TX (US); Sudhir Vittal Shetty, Cedar Park, TX (US); Wayne R. Weilnau, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,190

(22) Filed: Feb. 25, 2013

(65) Prior Publication Data

US 2013/0179566 A1 Jul. 11, 2013

Related U.S. Application Data

(63) Continuation of application No. 12/971,538, filed on Dec. 17, 2010, now Pat. No. 8,412,816.

(51) Int. Cl.
*G06F 15/173* (2006.01)
*G06F 11/00* (2006.01)

(52) U.S. Cl.
USPC .............................. 709/224; 714/48

(58) Field of Classification Search
USPC .................. 709/223–226; 714/47.1, 48–57
See application file for complete search history.

(56) References Cited

U.S. PATENT DOCUMENTS

| | | |
|---|---|---|
| 6,772,099 B2 | 8/2004 | Merkin et al. |
| 2005/0015672 A1 | 1/2005 | Yamada |
| 2007/0174686 A1 | 7/2007 | Douglas et al. |
| 2008/0313312 A1 | 12/2008 | Flynn et al. |
| 2009/0222677 A1 | 9/2009 | Astigarraga et al. |
| 2010/0180110 A1 | 7/2010 | Mittapalli et al. |
| 2010/0235688 A1 | 9/2010 | Bennah et al. |
| 2010/0313072 A1 | 12/2010 | Suffern |
| 2011/0029797 A1 | 2/2011 | Vaden |
| 2011/0138219 A1 | 6/2011 | Walton et al. |
| 2012/0239973 A1 | 9/2012 | Walton et al. |

*Primary Examiner* — Brendan Higa

(74) *Attorney, Agent, or Firm* — Haynes and Boone, LLP

(57) ABSTRACT

A communication system includes a storage operable to host an operating system and a management controller configured to directly communicate with the operating system. The management controller directly communicates with the operating system through a communication channel free of an intermediate agent. The management controller is operable to asynchronously send management information to the operating system over the communication channel. The management controller is also operable to asynchronously receive management information from the operating system over the communication channel.

20 Claims, 4 Drawing Sheets

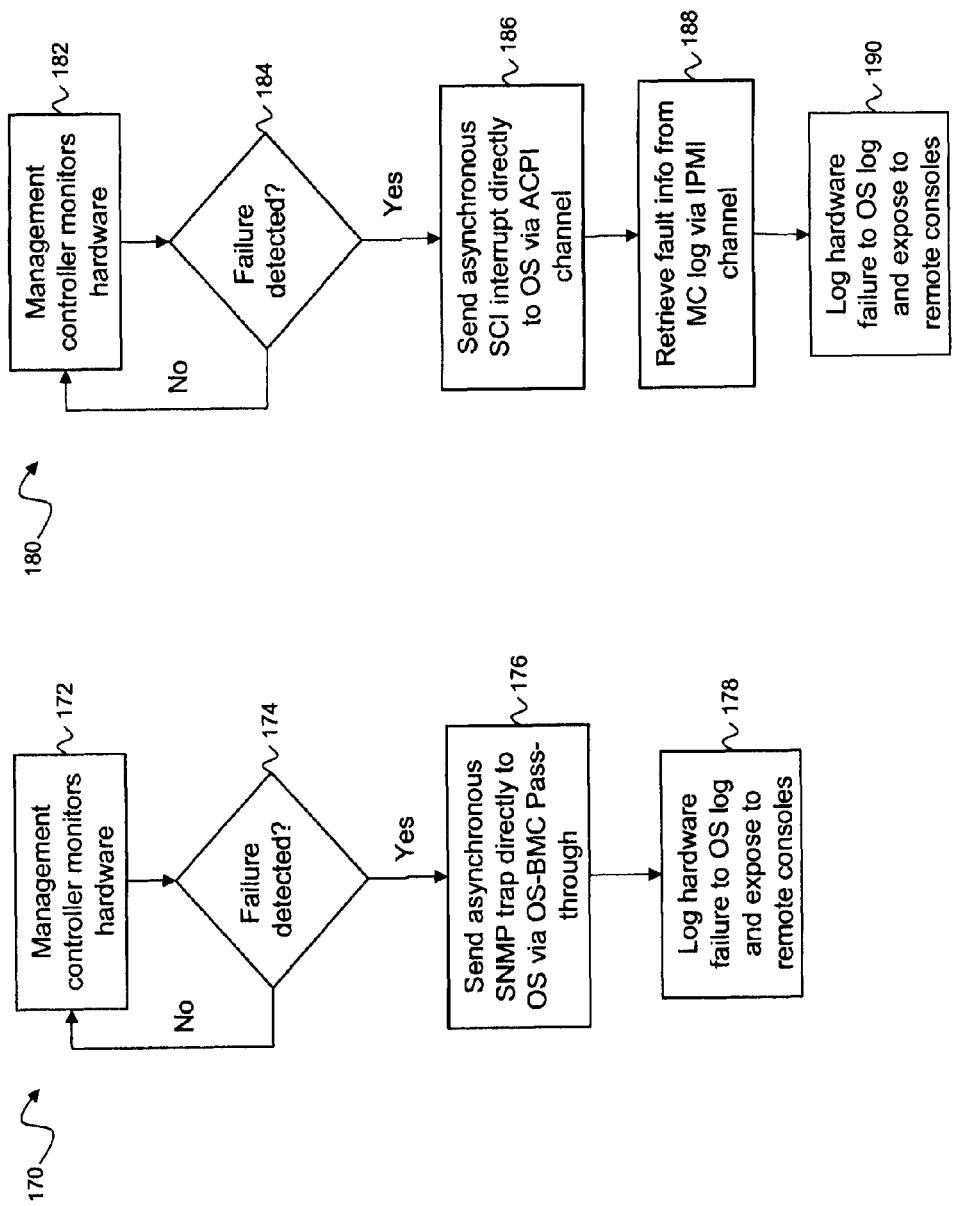

NATIVE BI-DIRECTIONAL COMMUNICATION FOR HARDWARE MANAGEMENT

CROSS REFERENCE TO RELATED APPLICATION

The present application claims priority to and is a continuation of co-owned, co-pending U.S. patent application Ser. No. 12/971,538 filed Dec. 17, 2010 (the disclosure of which is incorporated herein by reference.

BACKGROUND

The present disclosure relates generally to information handling systems, and more particularly to communication between an operating system and a management controller.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Information handling systems provide important network services for enterprises and individuals. To improve reliability of networks, IHSs often include management controllers, such as baseboard management controllers (BMC), that support off-line management functions. For example, a management controller typically supports remote power up and power down of a server system as well as remote maintenance. A BMC may also monitor the health of its host IHS by collecting information from internal sensors. The BMC makes the collected information available to the host operating system and remotely connected management consoles. Traditionally, remote management consoles have depended on agents installed in the host OS to periodically query the BMC for hardware information. These agents initiated and managed the majority of communications between the host OS and the BMC. However, dependence upon OS-present agents is not ideal. First, agents must be written for each OS and then updated as the OS is updated. Second, agents consume IHS resources. For example, an agent must continuously run in the background of the OS as it periodically polls the BMC for hardware faults.

Accordingly, it would be desirable to provide an improved system and method for communication between management controllers and operating systems.

SUMMARY

According to one embodiment, a communication system includes a storage operable to host an operating system, and a management controller configured to directly communicate with the operating system through a communication channel free of an intermediate agent, wherein the management controller is operable to asynchronously send management information to the operating system over the communication channel, and asynchronously receive management information from the operating system over the communication channel.

BRIEF DESCRIPTION OF THE DRAWINGS

FIG. 3 is a high-level flowchart illustrating a method of logging a hardware failure in the managed system of FIG. 1.

FIG. 4 is a high-level flowchart illustrating an alternative method of logging a hardware failure in the managed system of FIG. 1.

DETAILED DESCRIPTION

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
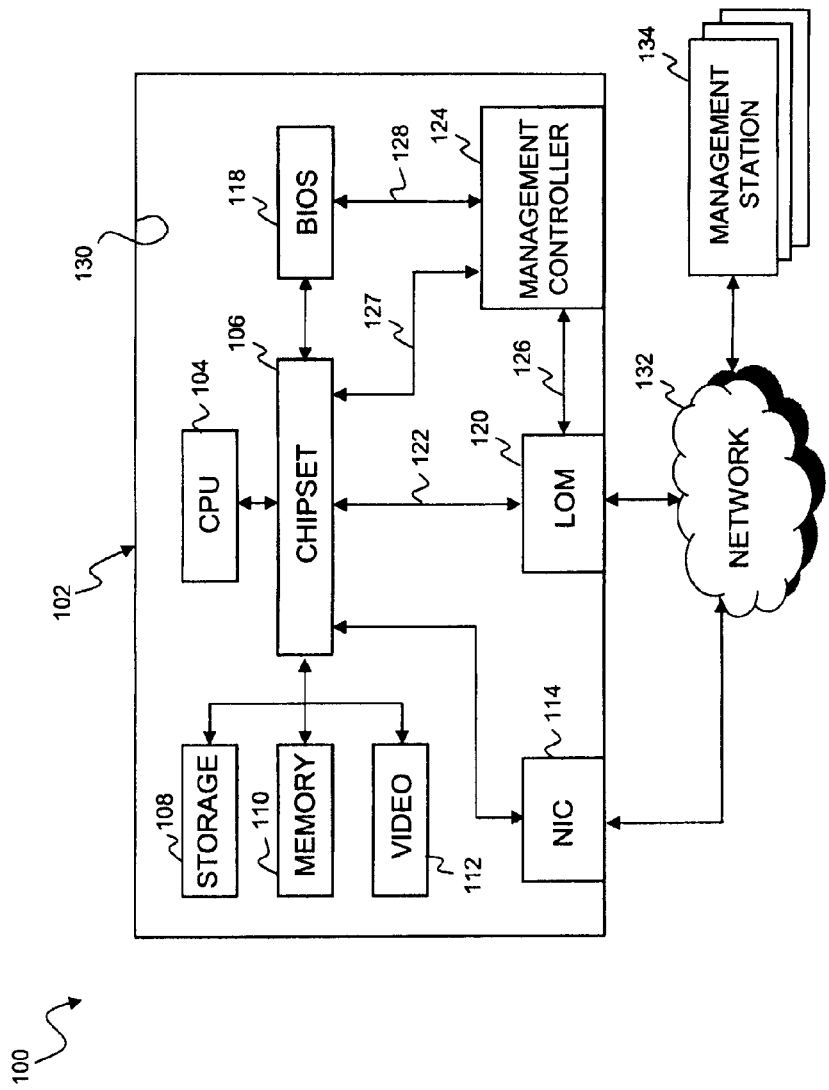
FIG. 1 is a functional block diagram of an exemplary embodiment of a managed system including an information handling system.

FIG. 1 is a functional block diagram of an exemplary embodiment of a managed system 100 including an information handling system (IHS) 102. IHS 102 includes a central processing unit (CPU) 104 coupled to a chipset 106. In other embodiments, IHS 102 may include multiple processors for simultaneous processing. Chipset 106 may be provided using a chipset that includes two or more parts. For example, chipset 106 may include a Graphics and Memory Controller Hub (GMCH) and an I/O Controller Hub (ICH), or may include a Northbridge and a Southbridge. In IHS 102, programs and data are stored on a mass storage device 108, which is coupled to CPU 104. Examples of mass storage devices may include hard discs, optical disks, magneto-optical discs, solid-state storage devices, and/or a variety other mass storage devices known in the art. A system memory 110 is coupled to CPU 104 to provide the processor with fast storage to facilitate execution of computer programs by CPU 104. Examples of system memory may include random access memory (RAM) devices such as dynamic RAM (DRAM), synchronous DRAM (SDRAM), solid state memory devices, and/or a variety of other memory devices known in the art. In an embodiment, the IHS 102 includes a non-transitory computer-readable medium (e.g., the storage 108, the memory 110, etc) that may include computer-readable instructions that, when executed, cause the CPU 104 to perform a variety of functions. IHS 102 further includes a video controller 112 coupled to CPU 104, which may output video signals to a display (not illustrated). Additionally, IHS 102 includes a network interface card (NIC) 114 coupled to CPU 104. NIC 114 may be an add-in card, disposed on a main circuit board (e.g., a baseboard, a motherboard, or any combination thereof), integrated onto another component such as chipset 106, or any combination thereof. In the current embodiment, NIC 114 provides IHS 102 with network connectivity through an Ethernet interface, but alternatively NIC 114 may implement other networking standards such as Fibre Channel and InfiniBand. IHS 102 also includes a basic input and output system (BIOS) module 118 coupled to chipset 106 via an I/O channel. BIOS 118 can include BIOS code operable to detect and identify resources within IHS 102, provide the appropriate drivers for those resources, initialize those resources, and access those resources. IHS 102 further includes a LAN-on-motherboard (LOM) network device 120 coupled to chipset 106 via a Peripheral Component Interconnect Express (PCIe) connection 122. LOM 120 provides further network connectivity to IHS 102. To provide intelligent routing of network traffic, LOM 120 includes a processor that executes firmware stored in an internal computer readable medium.

IHS 102 further includes a management controller 124, which may be a system-on-chip on a main circuit board (e.g., a baseboard, a motherboard, or any combination thereof), integrated onto another component such as chipset 106, a separate add-in card, or any combination thereof. Management controller 124 may be a baseboard management controller (BMC), an integrated Dell remote access controller (iDRAC), another out-of-band (OOB) controller, or any combination thereof. Management controller 124 includes a service processor, random-access memory (RAM), and non-volatile RAM (NVRAM). Information stored in the NVRAM is not lost when management controller 124 loses power. Further, management controller 124 may be on a separate power plane from the other components in IHS 102, so that management controller 124 can be operated while other portions of IHS 102 are powered off.

Management controller 124 includes a plurality of interfaces to facilitate connection to other components in IHS 102. In the current embodiment, management controller 124 includes a media access control (MAC) interface, a Keyboard Control Style (KCS) interface, and a serial interface. The serial interface may be one of a Inter-Integrated Circuit ($I^2C$) interface, a System Management Bus (SMBus) interface, a Serial Peripheral Interface (SPI) interface, a Universal Asynchronous Receiver Transmitter (UART), or any other suitable interface known in the art. These interfaces physically connect management controller 124 to a number of data busses in IHS 102. Specifically, the MAC interface connects to a network controller side band interface (NC-SI) bus 126, thereby coupling management controller 124 to LOM 120. The NC-SI bus 126 may be implemented as a SMBus, a Reduced Media Independent Interface (RMII) bus, or any other suitable bus. In the current embodiment, the NC-SI bus 126, LOM 120, and PCIe connection 122 together comprise a data path known as an operating system-baseboard management controller pass-through (OS-BMC Pass-through). Additionally, the management controller's KCS interface connects to a KCS interface bus 127, thereby coupling management controller 124 to chipset 106. The KCS interface bus 127 may be implemented as a Low Pin Count (LPC) bus, or any other suitable bus. Finally, the serial interface connects to a serial bus 128, thereby coupling management controller 124 to BIOS 118 and thus chipset 106. The serial bus 128 may be implemented as a $I^2C$ bus, SPI bus, or any other suitable bus. While a particular management controller has been described, one of ordinary skill in the art will recognize that the management controller may include additional and/or different data interfaces without departing from the scope of the present disclosure. And one of ordinary skill in the art may also recognize that additional and/or different internal data buses may couple management controller 124 to other components in IHS 102.

In an embodiment, a chassis 130 houses some or all of the components of IHS 102. It should be understood that IHS 102 may include additional components such as input devices or disk controllers and that additional buses and intermediate circuits may be deployed between the components described above and CPU 104 to facilitate internal communication.

In managed system 100, IHS 102 is coupled to a network 132 via NIC 114 and LOM 120. Network 132 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of data. Management stations 134 are coupled to IHS 102 through network 132 and may be information handling systems operable to receive data from and communicate data to IHS 102 via network 132. Management stations 134 may be servers, personal computers, mobile devices, or any other device with network connectivity.

In operation, managed system 100 is a systems management hardware and software solution that provides remote management capabilities, crashed system recovery, and power control functions for IHS 102. More specifically, in managed system 100, IHS 102 hosts an operating system tasked with executing applications and management controller 124 provides out-of-band management facilities for IHS 102. Management controller 124 functions as a separate microcontroller in IHS 102, providing a dedicated management channel for maintenance and control of resources. Preferably, management controller 124 is powered at all times and is thus available in-band when an operating system hosted on IHS 102 is running and also available out-of-band when IHS 102 is powered down or has no network connectivity through NIC 114. A core function of management controller 124 is the collection of data from a variety of sensors within chassis 130. For example, management controller 124 may collect hardware operational data such as temperature, fan speed, current, voltage, memory status, and make this data available to managed system 100. Further, management stations 134 in managed system 100 allow system administrators to remotely manage, monitor, troubleshoot, remediate, and upgrade IHS 102, independent of the operating system status.

Management information, such as network identification data and the above mentioned sensor data, may be communicated between the operating system hosted by IHS 102 and management controller 124 via a plurality of internal channels, such as the NC-SI bus 126 (OS-BMC Pass-through), the KCS interface bus 127, and the serial bus 128. In the case of the OS-BMC Pass-through, packets sent to the LOM 120 from the chipset 106 are monitored by a management module executing on LOM 120 to identify a destination address associated with the management controller 124, and then switched to proceed to the management controller without proceeding through the external network 132. U.S. patent application Ser. No. 12/706,085, entitled "System and Method for Communication Between an Information Handling System and Management Controller Through a Shared LOM," discloses further aspects of the OS-BMC Pass-through and is hereby incorporated by reference in its entirety. These internal communication paths will be discussed in greater detail below.

Figure 2:
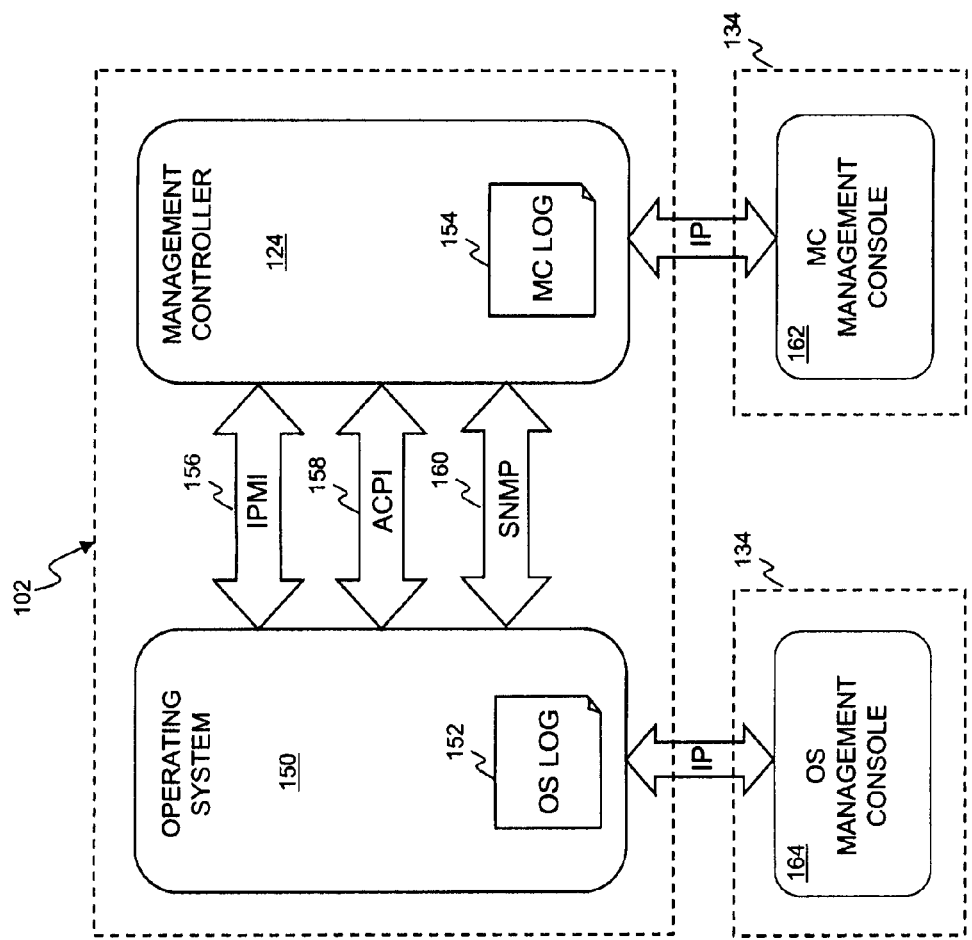
FIG. 2 is a functional block diagram of various communication paths in the managed system of FIG. 1.

FIG. 2 is a functional block diagram of various communication paths in the managed system 100 of FIG. 1. Remote management of IHS 102 in managed system 100 is accomplished through a variety of communication paths, both internal to IHS 102 and external to IHS 102. First, FIG. 2 illustrates a number of internal communication paths between management controller 124 and an operating system 150 hosted on IHS 102. Operating system 150 is stored on storage 108 (FIG. 1) and executed by CPU 104 (FIG. 1). Operating system 150 may be any number of operating systems including Microsoft Windows, Linux, and VMWare ESXi. To capture system events, errors, and other information, operating system 150 maintains an OS log 152. For example, Windows captures system events in a Windows Event Log and Unix-based systems capture events in a syslog. Similarly, management controller 124 maintains a MC log 154 to store both hardware operational data and configuration data about IHS 102, including operating system name and version and network hostname. MC log 154 may be a single file or a plurality of files stored in the non-volatile storage (NVRAM) associated with the management controller 124.

In IHS 102, communication between operating system 150 and management controller 124 is direct. That is, management information passed between the two is routed through established channels without the use of an intermediate agent installed in the operating system environment. This native bi-directional communication passes through any of the NC-SI bus 126 (OS-BMC Pass-through), the KCS interface bus 127, and the serial bus 128, and is implemented using standard protocols typically implemented in a modern information handling system. For instance, the operating system 150 and management controller 124 may communicate using an Intelligent Platform Management Interface (IPMI) channel 156 routed over the KCS interface bus 127 or over the OS-BMC Pass-through. Direct communication between the operating system 150 and management controller 124 may also be implemented over an Advanced Configuration and Power Interface (ACPI) channel 158 routed through BIOS 118 and serial bus 128. In the ACPI channel 158, the operating system 150 communicates with BIOS 118, and BIOS 118, in turn, communicates with management controller 124 via serial bus 128. In an alternative embodiment, BIOS 118 may communicate with management controller 124 via a KCS bus or through a shared memory. Further, operating system 150 and management controller 124 may communicate through a Simple Network Management Protocol (SNMP) channel 160 over the OS-BMC Pass-through. Both the operating system 150 and management controller 124 natively support communication through each of these channels, and thus, no agent is needed on top of operating system 150 to facilitate communication between the two, as is known in conventional systems. For instance, operating system 150 may directly receive a notification of a hardware failure from the management controller 124 over the ACPI channel 158 and subsequently log the event in the OS log 152. In this example, there is no need for an OS-present agent to periodically poll the management controller 124 for hardware faults, as is known in conventional systems. While a number of communication channels have been described, one of ordinary skill in the art will recognize that IHS 102 may contain additional an/or different types of communication channels through which native bi-directional communication may take place. (Note, that in the context of this disclosure, the term "agent" refers to a software program that executes in the operating system environment but is not part of the operating system itself. For example, an "agent" may be a software program developed by a third party and installed after an operating system has been deployed on an IHS. Furthermore, in an embodiment, an "agentless" or "native" communication path, as used herein, may include an agent internally implemented in an operating system. For instance, the Microsoft Windows operating system internally implements a SNMP service that includes an SNMP agent. Such an internal agent is "native" to Windows and may not be considered an "agent".)

Management information passed between the operating system 150 and management controller 124 may also be available to system administrators using management consoles on management stations 134. Depending on what type of task needs to be performed, a system administrator may remotely connect to IHS 102 using different types of management consoles. For example, management controller 124 may expose an MC management console 162 for remote administration of management controller 124 and remote access to MC log 154. The MC management console 162 may be a web-based console or may be a simple command line interface. On the other hand, a systems administrator may remotely manage IHS 102 through an OS management console 164 that takes advantage of a systems management stack exposed by the operating system 150, such as WS-MAN on Unix-based systems or WMI on Windows-based systems. Further, a 1:n management console may simultaneously connect to the in-band channel (through operating system 150) and the out-of-band channel (through management controller 124), and aggregate information received from both channels.

A benefit to agentless bi-directional communication is that management information traditionally available only through the MC management console 162 is available through the OS management console 164. That is, management controller 124 can directly push management information up to the operating system 150 so it can then expose it using a management stack such as WS-MAN. Similarly, management information traditionally available only through the OS management console 164 is available through the MC management console 162. In this manner, a system administrator connected through either MC management console 162 or OS management console 164 has a more complete picture of the status of IHS 102. In conventional systems, a system administrator has to rely on an agent installed in the operating system to collect this management information and make it available to remote management consoles. Also, in conventional systems, critical operating system information may not be available to a management console connected to the management controller.

Using agentless communication channels 156, 158, and 160, the operating system 150 and management controller 124 bi-directionally pass a variety of management information. For example, the operating system 150 may transmit the operating system name, version, and network management information to the management controller 124. The network management information may include host name, IP address, MAC address, and any Virtual Local Area Network (VLAN) identifiers. Upon receiving the management information, the management controller 124 may store it in the MC log 154 so as to make it available to remotely connected MC management console 162. Further, the operating system 150 may natively implement a heartbeat application that periodically sends management controller 124 a data packet over any of the agentless communication channels 156, 158, and 160. If management controller 124 ceases receiving a periodic heartbeat (an indication that operating system 150 may have crashed) it can take appropriate recovery action. In an embodiment, this action may include sending an alert to a remote console such as MC management console 162. In an alternative embodiment, this action may include rebooting (power-cycling) the IHS 102. In conventional systems, an agent installed in the operating system environment implements this heartbeat functionality. The operating system 150 may additionally send any other information to the management controller 124 that may be helpful in the administration of IHS 102.

Management controller 124 transmits the following management information to operating system 150 via agentless communication channels 156, 158, and 160. First, the management controller 124 makes available its IP address so system administrators connected to IHS 102 through OS management console 164 are aware that an out-of-band controller is installed in IHS 102. Along with its IP address, management controller 124 may transmit to the operating system 150 the URL of its MC management console 162. Further, drawing from the data collected by hardware sensors, management controller 124 may also directly send operating system 150 management information related to the physical health of the IHS 102. Operating system 150 may then expose this information to the OS management console 164, enabling the console to display a global health indicator to system administrators. In conventional systems, operating systems do not have direct access to IHS health information, and thus cannot expose it to management consoles. Instead, operating systems rely upon third-party agents to collect health information from the management controller. Further, the management console 124 may send operating system 150 information about a service tag attached to IHS 102. Any 1:n management consoles that connect to both the in-band and out-of-band channels of IHS 102 may use the service tag information to correlate information received through each. Finally, management controller 124 may asynchronously provide hardware fault information to operating system 150, so that operating system 150 can populate the OS log 152. The OS management console 164 may then scrape the OS log 152 to retrieve this information for display. In one embodiment, the management controller 124 minimally provides <timestamp>, <severity>, and <description> to the operating system 150 in the case of a hardware fault. In alternative embodiments, management controller 124 may directly log hardware failures in the OS log 152 through the use of WMI or WS-MAN calls, without the need for custom operating system code. The management controller 124 may additionally send any other information to the operating system 150 that may be helpful in the administration of IHS 102, including hardware inventory, configuration data, and power information.

FIG. 3 is a high-level flowchart illustrating a method 170 of logging a hardware failure in the managed system 100. Method 170 begins at block 172 where the management controller 124 monitors the hardware components of IHS 102 by collecting data from a multitude of internal sensors. At block 174, it is determined whether a hardware failure has been detected based on the sensor data. If no failure has been detected, method 170 returns to block 172 where management controller 124 continues to monitor. If a failure is detected, method 170 proceeds to block 176 where management controller 124 sends an SNMP trap directly to the operating system 150 via the SNMP channel 160 (OS-BMC Pass-through). The SNMP trap contains a description of the hardware fault. Management controller 124 sends the SNMP trap to the operating system 150 asynchronously—that is, without being prompted to do so by the operating system or an agent running in the operating system environment, as is known in conventional systems. At this block, management controller 124 may also log the hardware failure 124 to its MC log 154. Then, in block 178, the operating system 150 natively receives the SNMP trap and logs the hardware failure to the OS log 152. Once the fault has been recorded in the OS log 152, the OS management console 164 may access the information for display to system administrators.

FIG. 4 is a high-level flowchart illustrating an alternative method of logging a hardware failure in the managed system 100. Blocks 182 and 184 are similar to blocks 172 and 174 in FIG. 3 and will not be discussed again. After a failure has been detected in block 184, method 180 proceeds to block 186 where management controller 124 asynchronously sends a system control interrupt (SCI) directly to the operating system 150 via the ACPI channel 158. Alternatively, the management controller 124 may asynchronously send a system management interrupt (SMI) over an agentless channel to alert the operating system 150 of a hardware failure. At this block, management controller 124 logs the hardware failure to its MC log 154. Then, in block 188, after being alerted of a hardware failure, the operating system 150 natively retrieves the hardware fault info from the MC log 154 through the agentless IPMI channel 156. Finally, in block 190, the operating system 150 logs the hardware failure to the OS log 152, thereby exposing the fault to the OS management console 162. In conventional systems, the management controller, after detecting an hardware abnormality, simply logs the fault in its log. A period of time may pass before an agent installed in the operating system polls the management controller log and discovers the fault.

Figure 5:
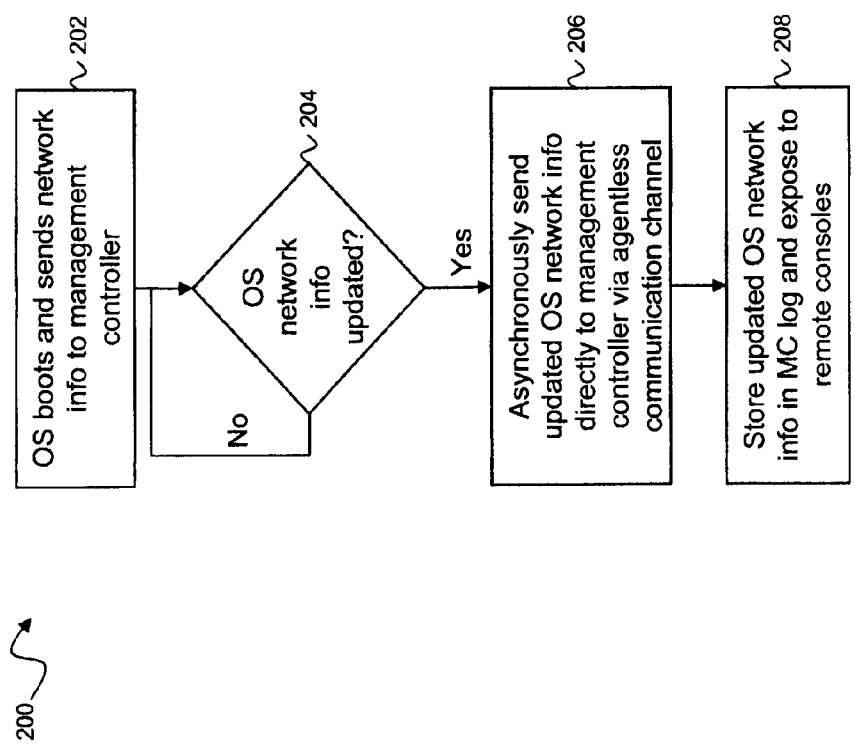
FIG. 5 is a high-level flowchart illustrating a method of updating operating system network information in the managed system of FIG. 1.

FIG. 5 is a high-level flowchart illustrating a method 200 of updating operating system network information in the managed system 100. Method 200 begins at block 202 where the operating system 150, upon bootup and initialization, sends its network identification information directly to management controller 124. The operating system network identification information may include DNS hostname, IP address, MAC address, and VLAN identifiers. Upon receipt, management controller 124 stores the information in MC log 154 or other non-volatile storage. At block 204, it is determined whether the operating system network identification information has changed since bootup. If the information has not changed, then method 200 stays at block 204. If the information has changed, then method 200 proceeds to block 206 where the operating system 150 asynchronously sends the updated network information directly to the management controller 124 via any of agentless communications channels 156, 158, or 160. Then, in block 208, the management controller 124 updates the previously stored operating system network identification information in the MC log 154 or other non-volatile storage. Once the operating system information has been updated in management controller 124, the MC management console 162 may access the information for display to system administrators. In conventional systems without native, bi-directional communication between the operating system and management controller, operating system network information is available only to management consoles connected to the operating system.

Thus a system and method for direct bi-directional communication between an operating system and an management controller without the use of an intermediate agent has been described. In an embodiment, the system and method described herein provides at least the following benefits over conventional systems: the elimination of the need for operating-specific agents to be written, deployed, and updated; the absence of an agent continually executing in the operating system saves processor cycles; asynchronous notification of hardware abnormalities by the management controller to the operating system reduces system down time; and important operating system information is readily available through a management console remotely connected to the management controller.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A communication system, comprising:
   a management controller; and
   a storage device storing an operating system;
   a processing system coupled to the management controller through a communication channel, wherein the processing system is operable to execute the operating system to directly communicate with the management controller free of an intermediate agent by:
      asynchronously sending management information to the management controller over the communication channel; and
      asynchronously receiving management information from the management controller over the communication channel.

2. The communication system of claim 1, wherein the management information asynchronously sent by operating system includes at least one of an operating system name, an operating system version, and network management information.

3. The communication system of claim 2, wherein the network management information includes at least one of a host name, an Internet Protocol (IP) address, a Media Access Control (MAC) address, and a Virtual Local Area Network (VLAN).

4. The communication system of claim 1, wherein the management information asynchronously received by the operating system includes at least one of a management controller IP address, a management controller Universal Resource Locator (URL), health information, a service tag, and hardware fault information.

5. The communication system of claim 4, wherein the operating system is operable to expose the health information to an operating system management console over a network.

6. The communication system of claim 4, wherein the hardware fault information includes an alert of a hardware fault and, in response to receiving the alert of the hardware fault, the operating system is operable to natively retrieve hardware fault details over the communications channel from a management controller log of the management controller.

7. The communication system of claim 1, wherein the management information asynchronously sent by operating system includes a periodic heartbeat.

8. An information handling system (IHS), comprising:
   a chassis;
   a processing system housed in the chassis; and
   a storage system housed in the chassis and coupled to the processing system;
   wherein the processing system and the storage system are operable to provide an operating system and a management controller that directly communicate through a communication channel free of an intermediate agent to provide for the asynchronous sending and receiving of management information between the operating system and the management controller over the communication channel.

9. The information handling system of claim 8, wherein the management information asynchronously sent by operating system includes at least one of an operating system name, an operating system version, and network management information.

10. The information handling system of claim 9, wherein the network management information includes at least one of a host name, an Internet Protocol (IP) address, a Media Access Control (MAC) address, and a Virtual Local Area Network (VLAN).

11. The information handling system of claim 8, wherein the management information asynchronously received by the operating system includes at least one of a management controller IP address, a management controller Universal Resource Locator (URL), health information, a service tag, and hardware fault information.

12. The information handling system of claim 11, wherein the operating system is operable to expose the health information to an operating system management console over a network.

13. The information handling system of claim 11, wherein the hardware fault information includes an alert of a hardware fault and, in response to receiving the alert of the hardware fault, the operating system is operable to natively retrieve hardware fault over the communications channel details from a management controller log of the management controller.

14. The information handling system of claim 8, wherein the management information asynchronously sent by operating system includes a periodic heartbeat.

15. A method for managing an information handling system (IHS), the method comprising:
   hosting an operating system by an information handling system that includes a management controller;
   providing direct communication between the operating system and the management controller, free of an intermediate agent, by:
      asynchronously sending management information from the operating system directly to a management controller through a communication channel; and
      asynchronously receiving management information at the operating system directly from the management controller over the communication channel.

16. The method of claim 15, wherein the management information asynchronously sent by operating system includes at least one of an operating system name, an operating system version, and network management information.

17. The method of claim 16, wherein the network management information includes at least one of a host name, an Internet Protocol (IP) address, a Media Access Control (MAC) address, and a Virtual Local Area Network (VLAN).

18. The method of claim 15, wherein the management information asynchronously received by the operating system includes at least one of a management controller IP address, a management controller Universal Resource Locator (URL), health information, a service tag, and hardware fault information.

19. The method of claim 18, wherein the operating system is operable to expose the health information to an operating system management console over a network.

20. The method of claim 15, wherein the management information asynchronously sent by operating system includes a periodic heartbeat.

* * * * *